US012730264B2

(12) United States Patent
Okahashi et al.

(10) Patent No.: US 12,730,264 B2
(45) Date of Patent: Sep. 8, 2026

(54) OPTICAL WAVEGUIDE ELEMENT, AND OPTICAL TRANSMISSION APPARATUS AND OPTICAL MODULATION DEVICE USING SAME

(71) Applicant: SUMITOMO OSAKA CEMENT CO., LTD., Tokyo (JP)

(72) Inventors: Kosuke Okahashi, Tokyo (JP); Yu Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 236 days.

(21) Appl. No.: 18/572,094

(22) PCT Filed: Aug. 31, 2021

(86) PCT No.: PCT/JP2021/032007

§ 371 (c)(1),
(2) Date: Dec. 19, 2023

(87) PCT Pub. No.: WO2023/032050

PCT Pub. Date: Mar. 9, 2023

(65) Prior Publication Data

US 2024/0231002 A1 Jul. 11, 2024

(51) Int. Cl.
*G02B 6/30* (2006.01)

(52) U.S. Cl.
CPC .................................... *G02B 6/305* (2013.01)

(58) Field of Classification Search
CPC ...................................................... G02B 6/305
See application file for complete search history.

(56) References Cited

U.S. PATENT DOCUMENTS

2015/0277043 A1 10/2015 Shimizu
2016/0025922 A1 1/2016 Kono et al.
(Continued)

FOREIGN PATENT DOCUMENTS

CN 111399118 A 7/2020
JP 2015-184528 A 10/2015
(Continued)

OTHER PUBLICATIONS

Li et al. High-efficiency edge-coupling based on lithium niobate on an insulator wire waveguide, Applied Optics. Jul. 28, 2020, vol. 59, No. 22, pp. 6694-6701 p. 6695. “Theoretical Analysis of the Coupling Model”, fig. 1.
(Continued)

*Primary Examiner* — Lisa M Caputo
(74) *Attorney, Agent, or Firm* — IPHORGAN LTD.

(57) ABSTRACT

Provided is an optical waveguide device including an optical waveguide, and a spot size converter connected to the optical waveguide, in which a propagation loss is further suppressed even in a case where an insulating layer covering the optical waveguide is disposed. An optical waveguide device includes an optical waveguide 2 formed on a substrate 1, and a spot size converter SSC that changes a mode field diameter of a light wave propagating through the optical waveguide in at least one end of the optical waveguide 2, in which an insulating layer IL that covers at least an upper surface of the optical waveguide is provided, and the insulating layer IL is continuously disposed to the spot size converter SSC along the optical waveguide.

8 Claims, 7 Drawing Sheets

(56) References Cited

U.S. PATENT DOCUMENTS

| | | | | |
|---|---|---|---|---|
| 2022/0137478 | A1 | 5/2022 | Takahashi | |
| 2022/0308418 | A1 | 9/2022 | Kataoka | |
| 2024/0069281 | A1 * | 2/2024 | Kugimoto | G02F 1/025 |

FOREIGN PATENT DOCUMENTS

| | | | |
|---|---|---|---|
| JP | 2020-134689 | A | 8/2020 |
| JP | 2022-056981 | A | 4/2022 |
| JP | 2022-148652 | A | 10/2022 |

OTHER PUBLICATIONS

Qi, Yifan and Li, Yang, Integrated lithium niobate photonics, Nanophotonics, Apr. 28, 2020, vol. 9, No. 6, pp. 1287-1320, https://doi.org/10.1515/nanoph-2020-0013.

* cited by examiner 1
2
IL
MP
BA
SSC
SSC
Lout
Lin 1
2
IL
MP
SSC
SSC
Lout
Lin

OPTICAL WAVEGUIDE ELEMENT, AND OPTICAL TRANSMISSION APPARATUS AND OPTICAL MODULATION DEVICE USING SAME

CROSS REFERENCE TO RELATED APPLICATIONS

This application is a national stage completion application of PCT Application No. PCT/JP2021/032007, filed Aug. 31, 2021. The application is incorporated by reference herein in its entirety.

TECHNICAL FIELD

The present invention relates to an optical waveguide device, and an optical modulation device and an optical transmission apparatus using the same, and particularly to an optical waveguide device including an optical waveguide formed on a substrate, and a spot size converter that changes a mode field diameter of a light wave propagating through the optical waveguide in at least one end of the optical waveguide.

BACKGROUND ART

In the field of optical measurement technology or in the field of optical communication technology, optical waveguide devices such as an optical modulator using a substrate having an electro-optic effect have been widely used. Particularly, in accordance with an increase in information communication amount in recent years, a high frequency and a large capacity of optical communication used between cities or between data centers at a long distance have been desired. In addition, a high frequency and size reduction of the optical modulator are required because of a restricted space of a base station.

In achieving size reduction of the optical modulator, narrowing a width of the optical waveguide to form a micro optical waveguide can increase a confining effect of light. Consequently, a bending radius of the optical waveguide is decreased, and size reduction can be achieved. For example, lithium niobate (LN) having an electro-optic effect has small distortion and a small optical loss in converting an electrical signal into an optical signal and thus, is used as a long-distance optical modulator. In the optical waveguide of the LN optical modulator in the related art, a mode field diameter (MFD) is approximately 10 μm, and the bending radius of the optical waveguide is several tens of mm which is large. Thus, it is difficult to achieve size reduction.

In recent years, substrate polishing techniques and substrate bonding techniques have been improved and enabled LN substrates to be achieved as thin plates, and the MFD of the optical waveguide has also been studied and developed to be 3 μm or lower and approximately 1 μm. Since decreasing the MFD increases the confining effect of light, the bending radius of the optical waveguide can be further decreased.

As the width or a height of the optical waveguide is decreased, roughness of a surface of the optical waveguide significantly affects an optical loss of a light wave propagating through the optical waveguide. For example, in the case of forming a protruding optical waveguide (referred to as a rib type optical waveguide), surface degradation caused by fine roughness may occur on a side surface of a protruding portion depending on an etching speed or on an etching temperature.

In order to eliminate such a problem, Patent Literature No. 1 suggests providing a dielectric layer (insulating layer) that covers the optical waveguide.

Meanwhile, in the case of using a micro-optical waveguide having an MFD lower than 10 μmφ which is an MED of an optical fiber, directly joining an end portion (element end surface) of the optical waveguide provided in the optical waveguide device to the optical fiber causes a large insertion loss.

In order to eliminate such a problem, a spot size converter (SSC) is disposed in the end portion of the optical waveguide in Patent Literature No. 2. As an example of the SSC, configuring the SSC with a block body (insulating layer) covering the optical waveguide is suggested.

FIG. 1 is an example of an optical waveguide device in which a plurality of Mach-Zehnder type optical waveguides are integrated. The optical waveguide device is also used in a high bandwidth-coherent driver modulator (HB-CDM) and the like. In a case where the dielectric constant layer (insulating layer) of Patent Literature No. 1 is disposed and the block body (insulating layer) of the SSC of Patent Literature No. 2 is disposed in the optical waveguide device in FIG. 1, a boundary region BA in which the insulating layer is not present occurs. In a case where such a part in which the insulating layer is not continuous occurs, a difference in a refractive index around an optical waveguide 2 between parts before and after the boundary region BA is increased, and presence of the insulating layer scatters the light wave propagating through the optical waveguide and causes an increase in an optical loss. Lin denotes input light, and Lout denotes output light.

CITATION LIST

Patent Literature

[Patent Literature No. 1]: Japanese Patent Application No. 2021-050409 (filing date: Mar. 24, 2021)

[Patent Literature No. 2] Japanese Patent Application No. 2020-165004 (filing date: Sep. 30, 2020)

SUMMARY OF INVENTION

Technical Problem

An object to be solved by the present invention is to solve the above problem and to provide an optical waveguide device including an optical waveguide, and a spot size converter connected to the optical waveguide, in which a propagation loss is further suppressed even in a case where an insulating layer covering the optical waveguide is disposed. Furthermore, an optical modulation device and an optical transmission apparatus using the optical waveguide device are provided.

Solution to Problem

In order to solve the object, an optical waveguide device of the present invention, and an optical modulation device and an optical transmission apparatus using the same have the following technical features.

(1) An optical waveguide device includes an optical waveguide formed on a substrate, and a spot size converter that changes a mode field diameter of a light wave propagating through the optical waveguide in at least one end of the optical waveguide, in which an insulating layer that covers at least an upper surface of the optical waveguide is provided, and the insulating layer is continuously disposed to the spot size converter along the optical waveguide.

(2) In the optical waveguide device according to (1), the optical waveguide includes a modulation portion to which an electric field is applied to modulate a phase of the light wave propagating through the optical waveguide, and the insulating layer covers the modulation portion and is continuously disposed from the modulation portion to the spot size converter along the optical waveguide.

(3) In the optical waveguide device according to (2), the insulating layer functions as a clad portion of the optical waveguide in the modulation portion and functions as a core portion of the optical waveguide in the spot size converter.

(4) In the optical waveguide device according to (2) or (3), an upper surface of the insulating layer covering the modulation portion and an upper surface of the insulating layer of the spot size converter form the same plane.

(5) In the optical waveguide device according to any one of (1) to (4), the optical waveguide is a rib type optical waveguide, and the insulating layer also covers side surfaces of the optical waveguide.

(6) An optical modulation device includes the optical waveguide device according to any one of (1) to (5), a case accommodating the optical waveguide device, and an optical fiber through which a light wave is input into the optical waveguide or output from the optical waveguide.

(7) In the optical modulation device according to (6), the optical waveguide device includes a modulation electrode for modulating a light wave propagating through the optical waveguide, and an electronic circuit that amplifies a modulation signal to be input into the modulation electrode of the optical waveguide device is provided inside the case.

(8) An optical transmission apparatus includes the optical modulation device according to (6) or (7), and an electronic circuit that outputs a modulation signal causing the optical modulation device to perform a modulation operation.

Advantageous Effects of Invention

In the present invention, an optical waveguide device includes an optical waveguide formed on a substrate, and a spot size converter that changes a mode field diameter of a light wave propagating through the optical waveguide in at least one end of the optical waveguide, in which an insulating layer that covers at least an upper surface of the rib type optical waveguide is provided, and the insulating layer is continuously disposed to the spot size converter along the optical waveguide. Thus, non-continuous disposition of the insulating layer between the insulating layer covering the optical waveguide and the spot size converter can be suppressed, and the optical waveguide device in which the propagation loss of the light wave propagating through the optical waveguide is further suppressed can be provided. Furthermore, an optical modulation device and an optical transmission apparatus using the optical waveguide device in which the propagation loss is suppressed can be provided.

DESCRIPTION OF EMBODIMENTS

Hereinafter, an optical waveguide device of the present invention will be described in detail using preferred examples.

Figure 2:
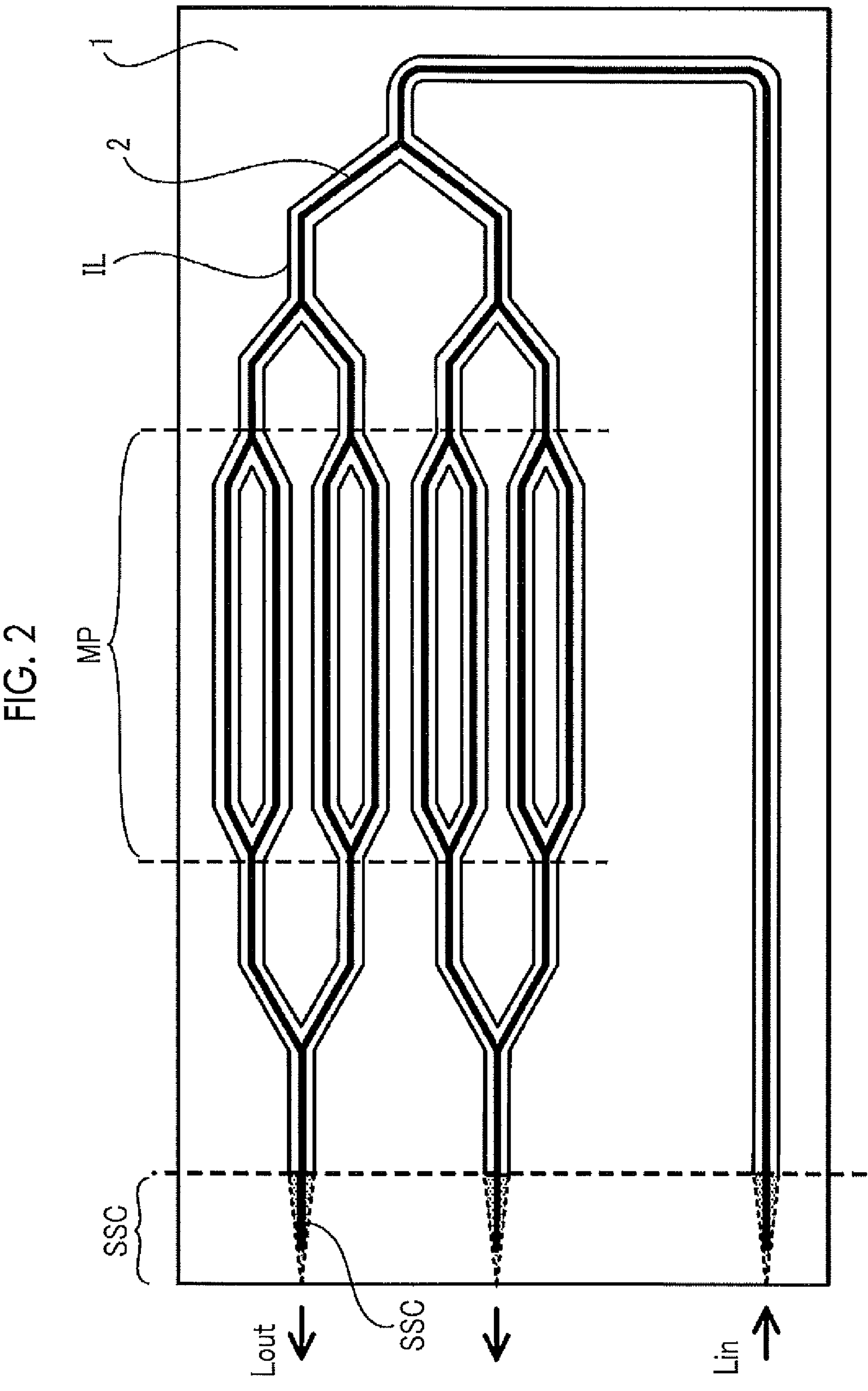
FIG. 2 is a plan view illustrating an example of an optical waveguide device according to the present invention.

As illustrated in FIG. 2, the optical waveguide device of the present invention includes an optical waveguide 2 formed on a substrate 1, and a spot size converter SSC that changes a mode field diameter of a light wave propagating through the optical waveguide in at least one end of the optical waveguide 2, in which an insulating layer IL that covers at least an upper surface of the optical waveguide is provided, and the insulating layer IL is continuously disposed to the spot size converter SSC along the optical waveguide.

As the material 1 that has an electro-optic effect and that is used in the optical waveguide device of the present invention, substrates of lithium niobate (LN), lithium tantalate (LT), lead lanthanum zirconate titanate (PLZT), and the like or base materials obtained by doping these substrate materials with magnesium can be used. In addition, vapor-phase growth films and the like formed of these materials can be used.

In addition, various materials such as semiconductor materials or organic materials can also be used as the optical waveguide.

As a method of forming the optical waveguide 2, a rib type optical waveguide obtained by forming a part corresponding to the optical waveguide to have a protruding shape in the substrate by, for example, etching the substrate 1 other than the optical waveguide or by forming grooves on both sides of the optical waveguide can be used. Furthermore, a refractive index can be further increased by diffusing Ti or the like on a surface of the substrate using a thermal diffusion method, a proton exchange method, or the like in accordance with the rib type optical waveguide. In addition, while the optical waveguide can be formed by forming a high-refractive index region obtained by thermally diffusing Ti or the like on the substrate 1, the rib type optical waveguide is more preferable because confinement of light is increased in the micro optical waveguide having a width and a height of approximately 1 μm.

A thickness of the substrate (thin plate) 1 on which the optical waveguide 2 is formed is set to 10 μm or lower, more preferably 5 μm or lower, and still more preferably 1 μm or lower in order to achieve velocity matching between a microwave of a modulation signal and the light wave. In addition, a height of the rib type optical waveguide is set to 4 μm or lower, more preferably 3 μm or lower, and still more preferably 1 μm or lower or 0.4 μm or lower. In addition, it is also possible to form a vapor-phase growth film on a reinforcing substrate and to process the film to have a shape of the optical waveguide.

Figure 4:
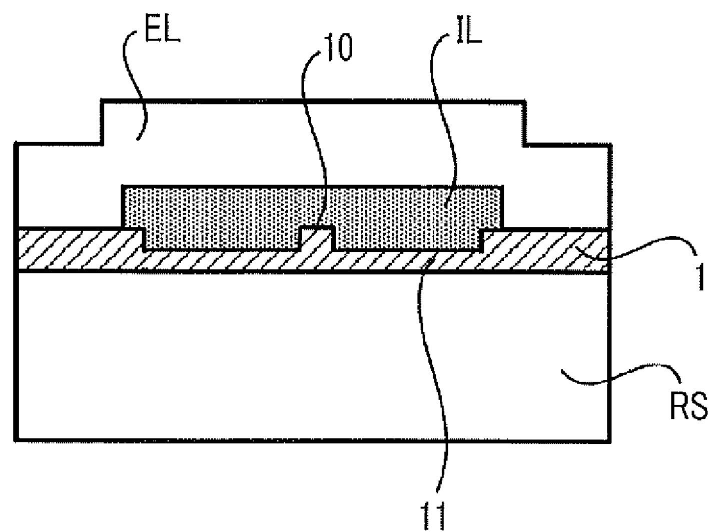
FIG. 4 is a cross section view illustrating the structure of the optical waveguide used in a region A in FIG. 3.

The substrate on which the optical waveguide is formed is adhesively fixed to a reinforcing substrate RS via direct joining or through an adhesive layer of resin or the like as illustrated in FIG. 4 and the like in order to increase mechanical strength. As the reinforcing substrate RS to be directly joined, a substrate including an oxide layer of a material such as crystal, glass, or the like that has a lower refractive index than the optical waveguide and than the substrate on which the optical waveguide is formed, and that has a similar coefficient of thermal expansion to the optical waveguide or the like is preferably used. Composite substrates obtained by forming a silicon oxide layer on a silicon substrate and by forming a silicon oxide layer on an LN substrate, which are abbreviated to SOI and LNOI, can also be used.

Figure 1:
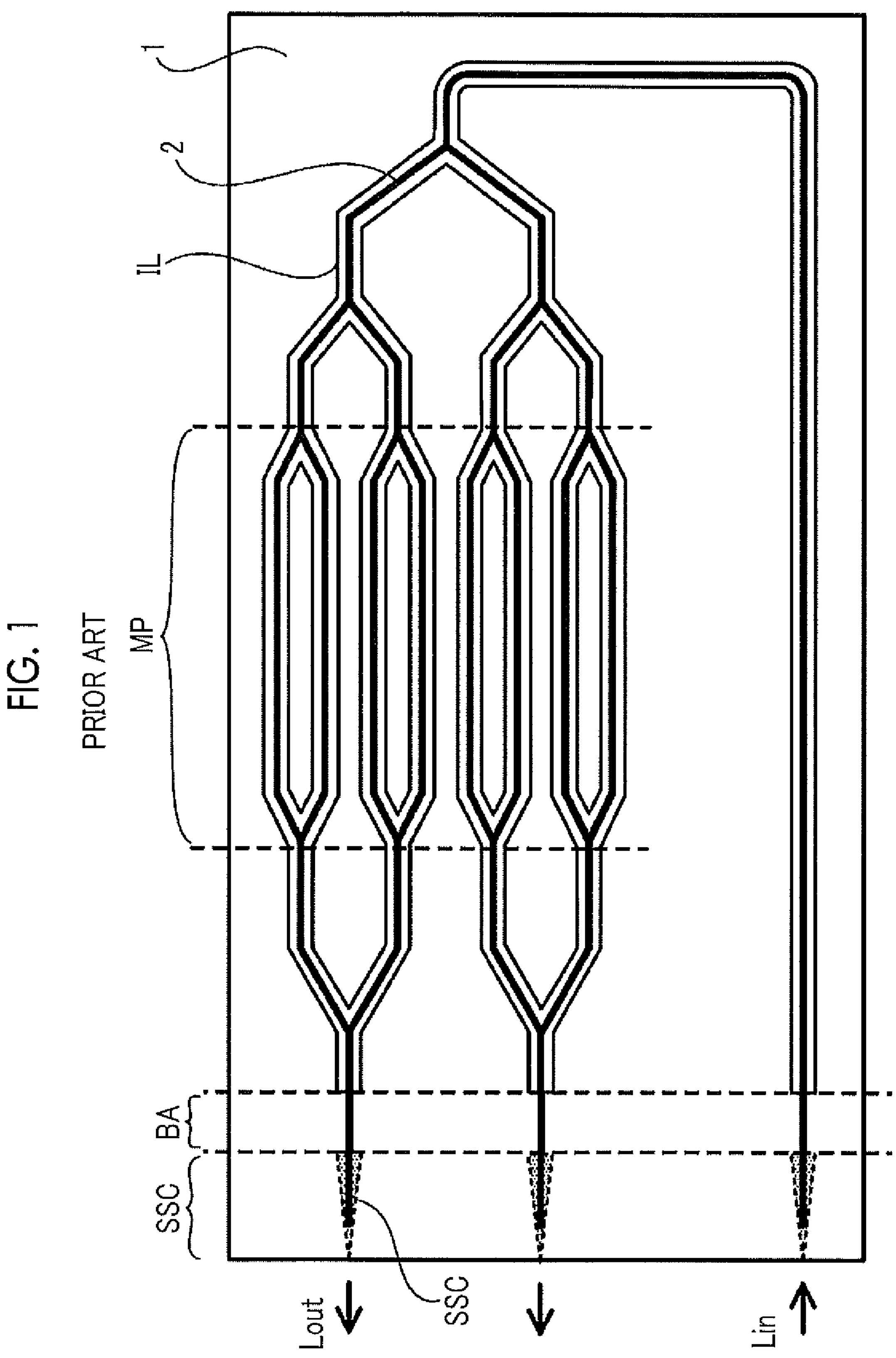
FIG. 1 is a plan view illustrating an example of applying an insulating layer of Patent Literature No. 1 and a spot size converter of Patent Literature No. 2 to an optical waveguide device.

The optical waveguide 2 in FIG. 2 is covered with the dielectric layer (insulating layer) IL shown in Patent Literature No. 1 in the same manner as that in FIG. 1. In a case where the high-refractive index region is formed by thermal diffusion or the like on the substrate 1 by the optical waveguide, the upper surface of the optical waveguide is covered with the insulating layer IL. In the case of the rib type optical waveguide, the upper surface and side surfaces of the optical waveguide are covered with the insulating layer IL.

The insulating layer IL is preferably a dielectric body having a refractive index higher than 1 and is set to have a refractive index of 0.5 times or higher and 0.75 times or lower of the refractive index of the optical waveguide 2. A thickness of the insulating layer IL is not particularly limited and can be formed up to a thickness of approximately 10 μm. In an optical waveguide part (except the SSC) including a modulation portion MP that modulates the light wave by applying a modulation signal to the optical waveguide 2, the optical waveguide 2 functions as a core portion, and the insulating layer functions as a clad portion.

While the insulating layer IL can be formed of an inorganic material such as $SiO_2$ using a sputtering method or a CVD method, an organic material such as resin may be used. As resin, a photoresist including a coupling agent (cross-linking agent) can be used, and a so-called photosensitive insulating film (permanent resist) that is cured by a cross-linking reaction developed by heat can be used. As resin, other materials such as polyamide-based resin, melamine-based resin, phenol-based resin, amino-based resin, and epoxy-based resin can also be used.

As a feature of the optical waveguide device of the present invention, a boundary region BA in which the insulating layer IL is not present as illustrated in FIG. 1 is not formed between the optical waveguide 2 including the modulation portion MP and the spot size converter SSC as illustrated in FIG. 2.

The "insulating layer that is continuously disposed to the spot size converter along the optical waveguide" in the present invention does not only mean that the boundary region BA in which the insulating layer is not present as illustrated in FIG. 1 is not formed. As will be described later, a case where a difference in a refractive index in a connection part between the insulating layer IL covering the optical waveguide 2 and the insulating layer constituting the spot size converter is set to a predetermined value or lower is also included. For example, it is desirable to set the predetermined value to 0.5 or lower. Of course, the insulating layer covering the optical waveguide 2 and the insulating layer used in the spot size converter may be configured with different materials. More preferably, the insulating film IL covering the optical waveguide continuously enters from a modulation portion side of the optical waveguide into the spot size converter as a part of the insulating layer constituting the spot size converter. Still more preferably, parts of the insulating layer of the optical waveguide on the modulation portion side and of the insulating layer constituting the spot size converter are formed at the same time using the same manufacturing process.

Figure 3:
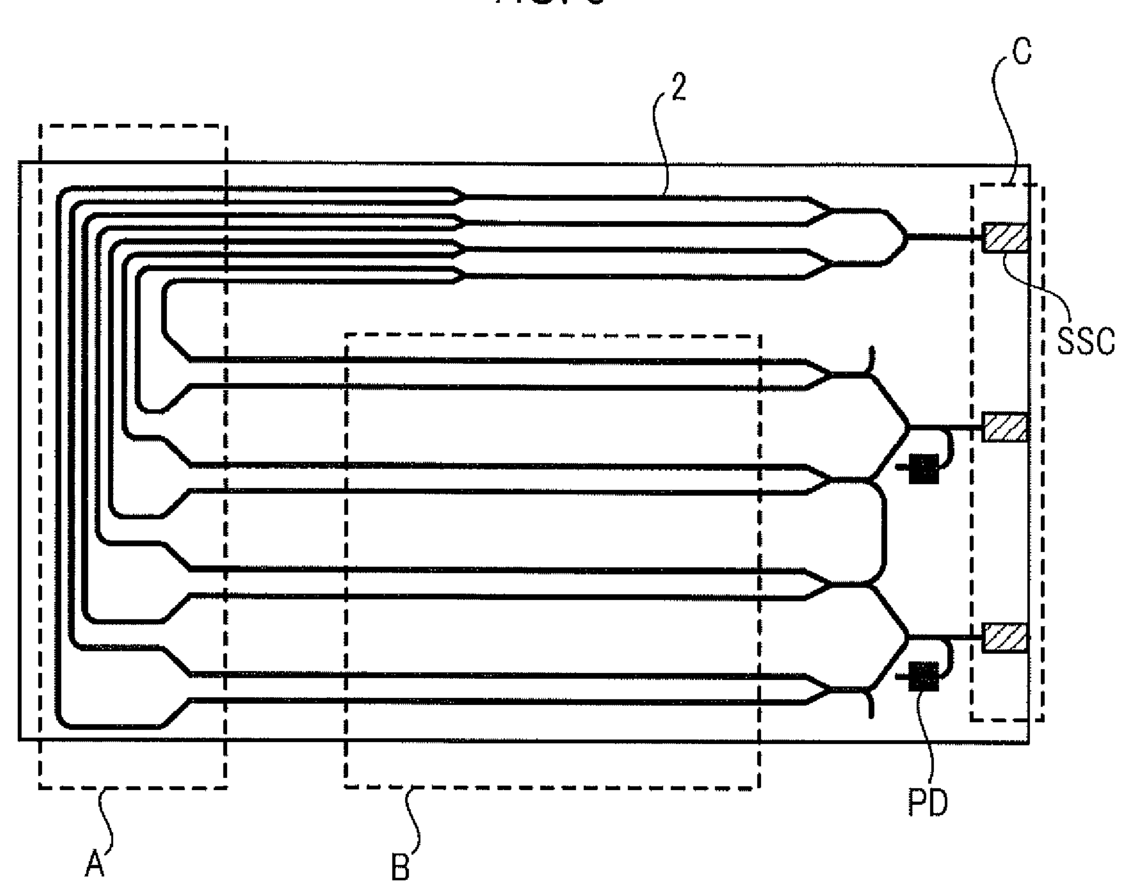
FIG. 3 is a plan view illustrating an example of the optical waveguide device and is a diagram illustrating regions in which an optical waveguide has different structures.

FIG. 3 is a plan view illustrating an example of the optical waveguide device that can be used in an HB-CDM or the like. Only a pattern of the optical waveguide 2 is illustrated for easy understanding of the drawing. Reference sign PD is a light-receiving element that receives a part of the light wave propagating through the optical waveguide.

A cross section view of the optical waveguide 2 in a region A in FIG. 3 is illustrated in FIG. 4. The substrate 1 is joined to the reinforcing substrate RS. The optical waveguide 2 is formed by a protruding portion 10 obtained by etching a part of the substrate 1. Reference sign 11 denotes a substrate part that is thinned by etching.

The insulating layer IL is disposed to cover the optical waveguide 2 (10), and an electrode layer EL is further disposed on the insulating layer IL. The electrode layer EL in FIG. 4 is a modulation electrode (not illustrated in FIG. 3) that extends to the modulation portion (a region of dotted line B) of the optical waveguide from a left side of FIG. 3, and constitutes a signal electrode or a ground electrode.

Figure 5:
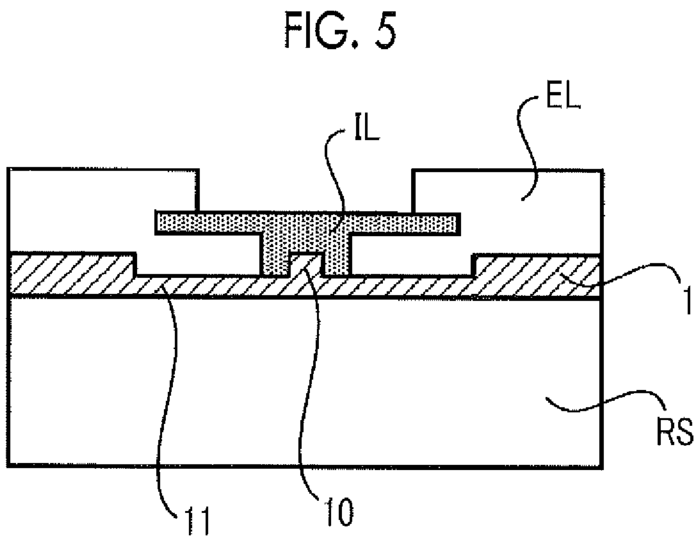
FIG. 5 is a cross section view illustrating the structure of the optical waveguide used in a region B in FIG. 3.

The modulation portion (region B) in FIG. 3 has an optical waveguide structure as illustrated in FIG. 5, and the insulating layer IL is disposed on the upper surface and both sides of the optical waveguide 2 (10). The electrode layer EL is formed close to the optical waveguide 2 (10), in which one of right and left parts is the signal electrode and an other part is the ground electrode. In addition, while the electrode layer EL is disposed to cover a part of an upper surface of the insulating layer IL in FIG. 5, the present invention is not limited to the electrode layer EL in FIG. 5. The electrode layer EL can also be disposed not to cover the upper surface of the insulating layer IL as shown in Patent Literature No. 1.

While the insulating layer IL can also be configured to partially cover both side surfaces and the upper surface of the protruding optical waveguide 10, an insulating property can be further increased by bringing the insulating layer IL into contact with surfaces other than a substrate surface of the protruding portion (a lower surface of the optical waveguide 10) as illustrated in FIG. 5.

Figure 6:
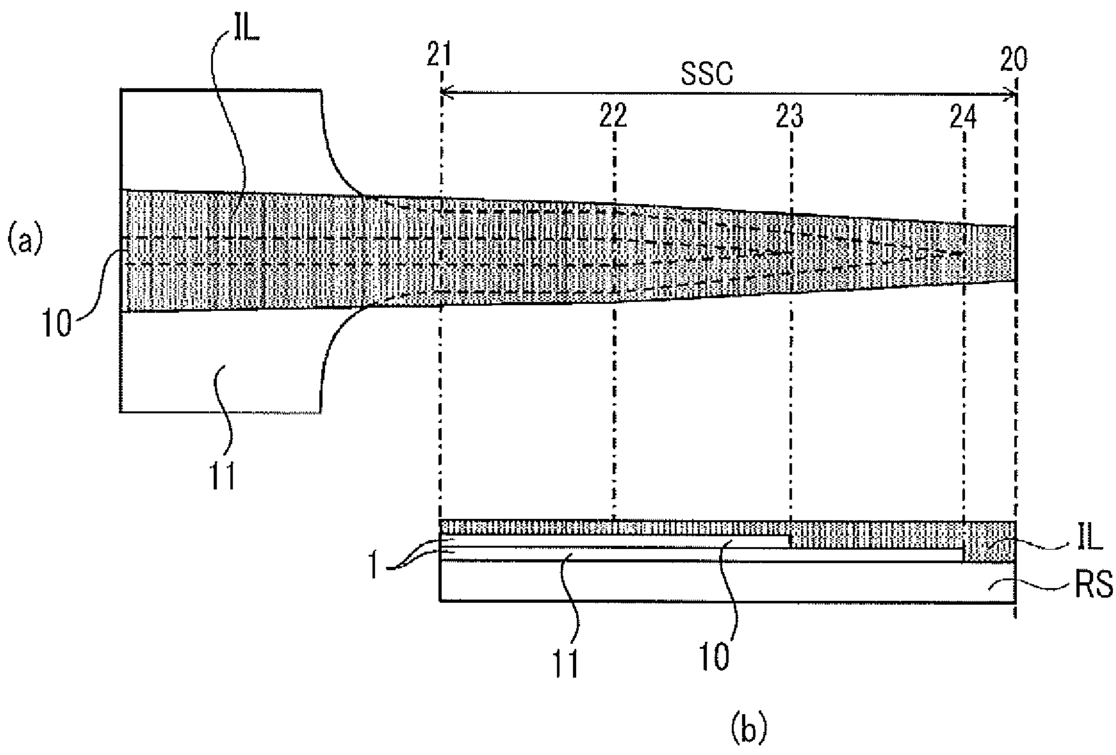
FIGS. 6A and 6B are plan views illustrating an example of an SSC in a region C in FIG. 3.

FIGS. 6A and 6B are plan views illustrating an example of the spot size converter SSC formed in a region C in FIG. 3. A cross section view taken along a propagation direction of the light wave in the SSC is illustrated on a lower side of FIGS. 6A and 6B. A left side (outside a range indicated by bidirectional arrow SSC) of FIGS. 6A and 6B is a part of the optical waveguide 2 (10) extending from the modulation portion (region B), and the insulating layer IL itself covering the optical waveguide 2 (10) is used as a part of the insulating layer constituting the SSC. In the SSC, a width of the protruding portion 10 (optical waveguide) formed on the substrate 1 is narrowed in a tapered shape toward a right side (one end of the optical waveguide) of FIGS. 6A and 6B, and a width of the etched substrate part (lower side part) 11 of the substrate 1 is also narrowed in a tapered shape. With this configuration, the light wave confined in the optical waveguide 10 gradually spreads to an insulating layer IL side, and the insulating layer IL is used as a core portion in the optical waveguide at a right end.

As illustrated in FIGS. 6A and 6B, the protruding portion related to the optical waveguide 10 is gradually narrowed to configure a diverging mode in a right direction of the drawing. The insulating layer IL receives the diverging light wave as the subsequent optical waveguide, and this constitutes the SSC. Thus, in a case where the same insulating layer IL is used in the modulation portion and in the SSC (the upper surface of the insulating layer is in the same plane in the modulation portion and in the SSC as a whole), the insulating layer in the SSC is dry-etched deeper than that in the modulation portion (refer to the lower right drawing (FIG. 6B) of FIGS. 6A and 6B).

A width of the insulating layer IL of the SSC is a narrowing width in a tapered shape from the viewpoint of converting a mode diameter and of confining light and has a width of approximately 5 μm at a position of dotted line 20 as illustrated on an upper side (FIG. 6A) of FIGS. 6A and 6B. Meanwhile, in the modulation portion, the width of the insulating layer IL has a width of 10 μm or higher from the viewpoint of a close contact or the like. Thus, a horizontal width of the insulating layer IL in the modulation portion is wider than that in the SSC.

Figure 7:
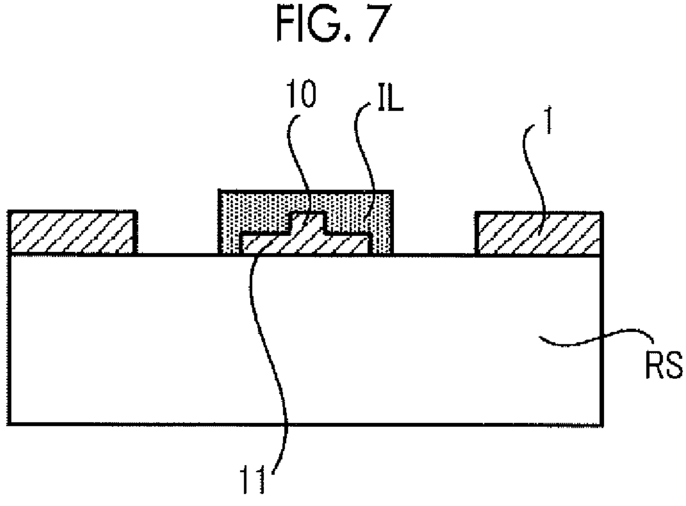
FIG. 7 is a cross section view illustrating the structure of the optical waveguide on dotted line 22 in FIGS. 6A and 6B.
Figure 8:
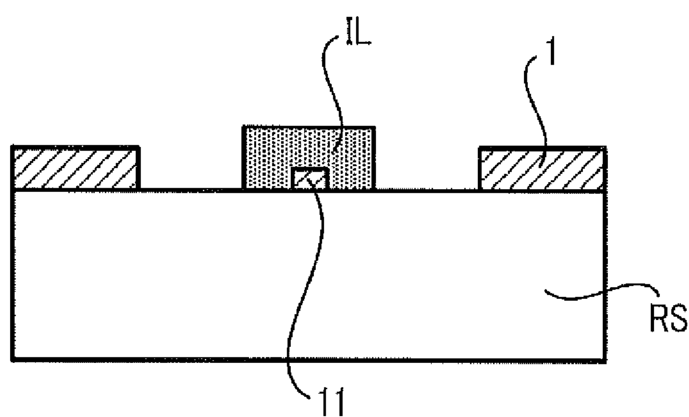
FIG. 8 is a cross section view illustrating the structure of the optical waveguide on dotted line 23 in FIGS. 6A and 6B.
Figure 9:
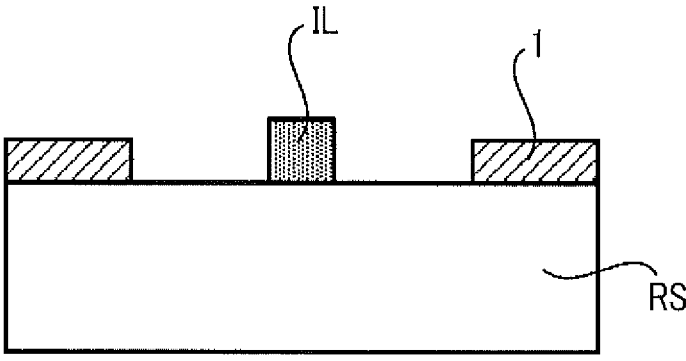
FIG. 9 is a cross section view illustrating the structure of the optical waveguide on dotted line 24 in FIGS. 6A and 6B.

FIGS. 7 to 9 illustrate cross section views taken along dotted lines 22 to 24, respectively, in FIGS. 6A and 6B. It is easily understood that the protruding portion 10 of the optical waveguide and the lower side part 11 of the substrate 1 gradually disappear as described above.

While the tapered part formed on the substrate (10, 11) in FIGS. 6A and 6B is gradually changed in width, the present invention is not limited to the tapered part in FIGS. 6A and 6B. The tapered part may be gradually thinned in thickness, or both may be combined.

In addition, while the insulating layer IL itself is used as the core portion of the SSC in FIGS. 6A and 6B, it is also possible to configure the insulating layer IL with a permanent resist and to dispose a separate dielectric layer, for example, a $SiO_2$ layer doped with gallium, having a higher refractive index than the insulating layer IL on the insulating layer IL in a right side part (for example, a right side with respect to dotted line 22, 23, or 24) of the SSC part, so that a center of the light wave is configured to be shifted to an upper side. Furthermore, it is possible to form the clad portion by disposing a $SiO_2$ layer having a low refractive index to cover an upper surface and side surfaces of the dielectric layer.

As illustrated in FIGS. 6A and 6B, continuously disposing the insulating layer IL from the modulation portion to the spot size converter along the optical waveguide 10 can reduce a propagation loss of the light wave propagating through the optical waveguide.

In addition, providing the upper surface of the insulating layer IL covering the modulation portion and the upper surface of the insulating layer IL constituting a part of the spot size converter in the same plane can further reduce the propagation loss.

Figure 10:
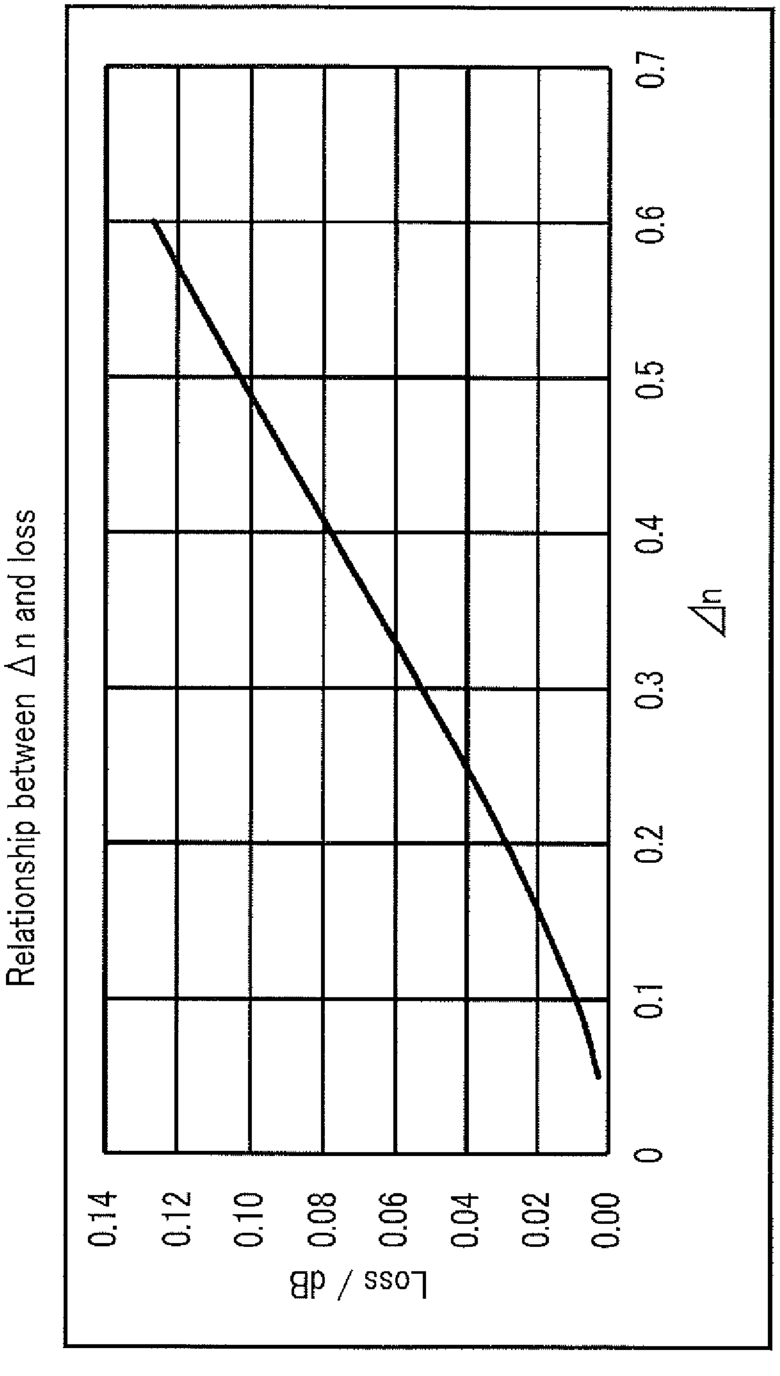
FIG. 10 is a graph showing a relationship between a difference $\Delta n$ in a refractive index and a propagation loss.

In a case where different insulating layers are used as illustrated in FIG. 10, the propagation loss (Loss) of the light wave in a boundary region between the insulating layers is increased in proportion to a size of a difference Δn in the refractive index between the insulating layers. Thus, the difference Δn in the refractive index between the insulating layers is set to the predetermined value or lower. Specifically, in a case where Δn is 0.5 or lower, the propagation loss is 0.1 dB or lower. In addition, in a case where Δn is 0.3 or lower, the propagation loss is 0.05 dB or lower.

Figure 11:
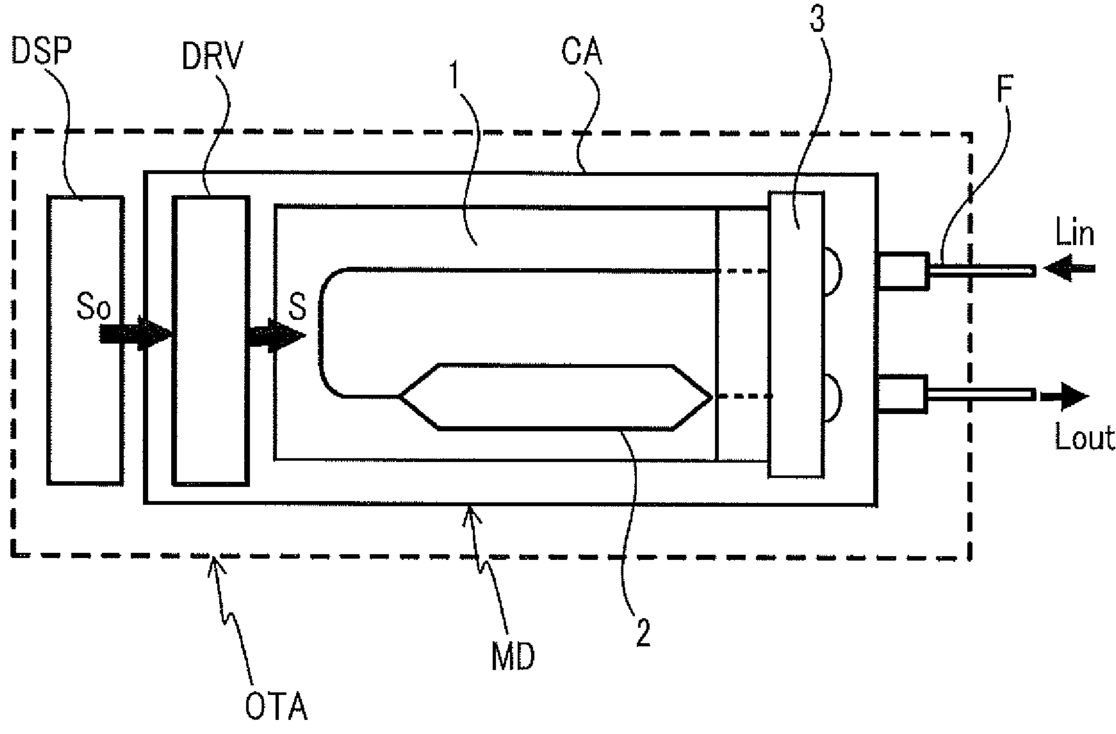
FIG. 11 is a plan view for describing an optical modulation device and an optical transmission apparatus of the present invention.

The optical waveguide device of the present invention is provided with a modulation electrode that modulates the light wave propagating through the optical waveguide 2, and the optical waveguide device is accommodated inside a case CA as illustrated in FIG. 11. Furthermore, an optical modulation device MD can be configured by providing an optical fiber (F) through which the light wave is input into the optical waveguide or output from the optical waveguide. In FIG. 11, the optical fiber F is optically coupled to the optical waveguide inside the optical waveguide device using an optical lens 3. The present invention is not limited to the optical fiber F in FIG. 11, and the optical fiber may be introduced into the case through a through-hole that penetrates through a side wall of the case, and be directly joined to the optical waveguide device.

An optical transmission apparatus OTA can be configured by connecting, to the optical modulation device MD, an electronic circuit (digital signal processor DSP) that outputs a modulation signal causing the optical modulation device MD to perform a modulation operation. The modulation signal to be applied to the optical waveguide device is required to be amplified. Thus, a driver circuit DRV is used. The driver circuit DRV and the digital signal processor DSP can be disposed outside the case CA or can be disposed inside the case CA. Particularly, disposing the driver circuit DRV inside the case can further reduce a propagation loss of the modulation signal from the driver circuit.

INDUSTRIAL APPLICABILITY

As described above, according to the present invention, it is possible to provide an optical waveguide device including an optical waveguide, and a spot size converter connected to the optical waveguide, in which a propagation loss is further suppressed even in a case where an insulating layer covering the optical waveguide is disposed. Furthermore, an optical modulation device and an optical transmission apparatus using the optical waveguide device can be provided.

REFERENCE SIGNS LIST

1: substrate (thin plate, film body) on which optical waveguide is formed
2: optical waveguide
IL: insulating layer
MP: modulation portion
SSC: spot size converter

The invention claimed is:

1. An optical waveguide device comprising:

an optical waveguide formed on a substrate; and a spot size converter that changes a mode field diameter of a light wave propagating through the optical waveguide in at least one end of the optical waveguide, wherein the optical waveguide is a rib type waveguide having a protruding shape in the substrate, a height of the rib type waveguide is set to 1 μm or lower, the optical waveguide includes a modulation portion to which an electric field is applied to modulate a phase of the light wave propagating through the optical waveguide, an insulating layer that covers an upper surface and side surfaces of the optical waveguide is provided, and the insulating layer is continuously disposed from the modulation portion to the spot size converter and is arranged linearly along the optical waveguide in plan view.

2. The optical waveguide device according to claim 1, wherein the insulating layer functions as a clad portion of the optical waveguide in the modulation portion and functions as a core portion of the optical waveguide in the spot size converter.

3. The optical waveguide device according to claim 1, wherein an upper surface of the insulating layer covering the modulation portion and an upper surface of the insulating layer of the spot size converter form the same plane.

4. An optical modulation device comprising:

the optical waveguide device according to claim 1;

a case accommodating the optical waveguide device; and an optical fiber through which a light wave is input into the optical waveguide or output.

5. The optical modulation device according to claim 4, wherein the optical waveguide device includes a modulation electrode for modulating a light wave propagating through the optical waveguide, and an electronic circuit that amplifies a modulation signal to be input into the modulation electrode of the optical waveguide device is provided inside the case.

6. An optical transmission apparatus comprising:

the optical modulation device according to claim 4; and an electronic circuit that outputs a modulation signal causing the optical modulation device to perform a modulation operation.

7. The optical waveguide device according to claim 1, the optical waveguide has a Mach-Zehnder type optical waveguide with two branched waveguides, and the insulating layer is not disposed between the two branched waveguides.

8. The optical waveguide device according to claim 1, the optical waveguide has a plurality of Mach-Zehnder type optical waveguides, and the insulating layer is not disposed between adjacent Mach-Zehnder type optical waveguides.

* * * * *